United States Patent
Shimatsu et al.

(10) Patent No.: US 9,822,746 B2
(45) Date of Patent: Nov. 21, 2017

(54) FUEL INJECTION CONTROL APPARATUS

(71) Applicant: KEIHIN CORPORATION, Shinjuku-ku, Tokyo (JP)

(72) Inventors: Takayuki Shimatsu, Shioya-gun (JP); Masamitsu Mori, Shioya-gun (JP); Masateru Moriya, Sakura (JP); Gaku Sato, Utsunomiya (JP); Ikuhiro Uemura, Shioya-gun (JP)

(73) Assignee: KEIHIN CORPORATION, Tokyo (JP)

(*) Notice: Subject to any disclaimer, the term of this patent is extended or adjusted under 35 U.S.C. 154(b) by 0 days.

(21) Appl. No.: 15/131,517

(22) Filed: Apr. 18, 2016

(65) Prior Publication Data

US 2016/0333813 A1    Nov. 17, 2016

(30) Foreign Application Priority Data

May 15, 2015    (JP) .................................. 2015-100120

(51) Int. Cl.
*F02M 51/06*     (2006.01)
*F02D 41/40*     (2006.01)
(Continued)

(52) U.S. Cl.
CPC ....... *F02M 51/0632* (2013.01); *F02D 35/023* (2013.01); *F02D 41/40* (2013.01);
(Continued)

(58) Field of Classification Search
CPC ............... F02M 51/06; F02M 51/0632; F02M 51/0685; F02M 57/005; F02M 2200/247; F02D 41/41; F02D 41/20; F02D 35/02; F02D 35/023; F02D 2200/0618; Y02T 10/44

See application file for complete search history.

(56) References Cited

U.S. PATENT DOCUMENTS

| | | | | |
|---|---|---|---|---|
| 3,448,728 A * | 6/1969 | Scholl | ..................... | F02D 41/04 123/484 |
| 6,367,721 B1 * | 4/2002 | Ikeya | ................. | F02M 51/0671 239/533.7 |
| 2015/0377176 A1 * | 12/2015 | Hatanaka | ............. | F02M 51/061 137/554 |

FOREIGN PATENT DOCUMENTS

| | | |
|---|---|---|
| JP | 06048004 U | 6/1994 |
| JP | 2014095325 A | 5/2014 |

(Continued)

OTHER PUBLICATIONS

Notice of Reasons for Rejection for corresponding Japanese Application No. 2015-100120; dated May 16, 2017.

(Continued)

*Primary Examiner* — Hieu T Vo
(74) *Attorney, Agent, or Firm* — Cantor Colburn LLP

(57) ABSTRACT

A fuel injection control apparatus is provided with a first valve opening timing determination portion that determines a first valve opening timing on the basis of a collision signal that is included in detected signals of an in-cylinder pressure sensor and indicates a collision between a movable core and a valve element and a second valve opening timing determination portion that determines a second valve opening timing on the basis of another collision signal that is included in the detected signals and indicates a collision between the movable core and a stationary core.

6 Claims, 6 Drawing Sheets

(51) Int. Cl.
*F02D 35/02* (2006.01)
*F02D 41/20* (2006.01)
*F02M 57/00* (2006.01)

(52) U.S. Cl.
CPC ...... *F02D 41/20* (2013.01); *F02D 2200/0618* (2013.01); *F02M 51/0685* (2013.01); *F02M 57/005* (2013.01); *F02M 2200/247* (2013.01); *Y02T 10/44* (2013.01)

(56) References Cited

FOREIGN PATENT DOCUMENTS

| JP | 2014152740 A | 8/2014 |
| JP | 2015052368 A | 3/2015 |
| JP | 2015063928 A | 4/2015 |

OTHER PUBLICATIONS

Notice of Reasons for Rejection for corresponding JP Application No. 2015-100120; dated Aug. 1, 2017.

* cited by examiner

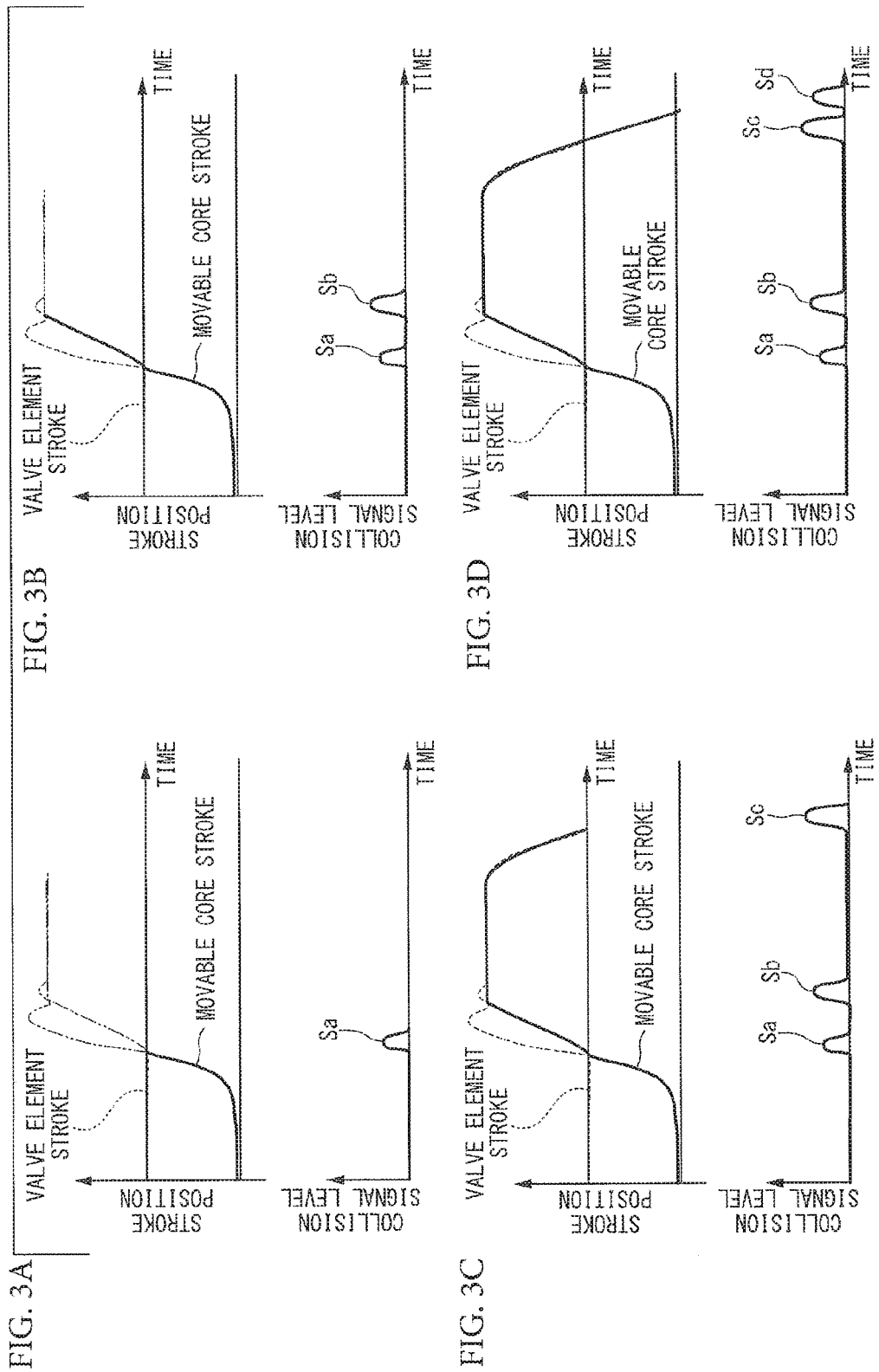

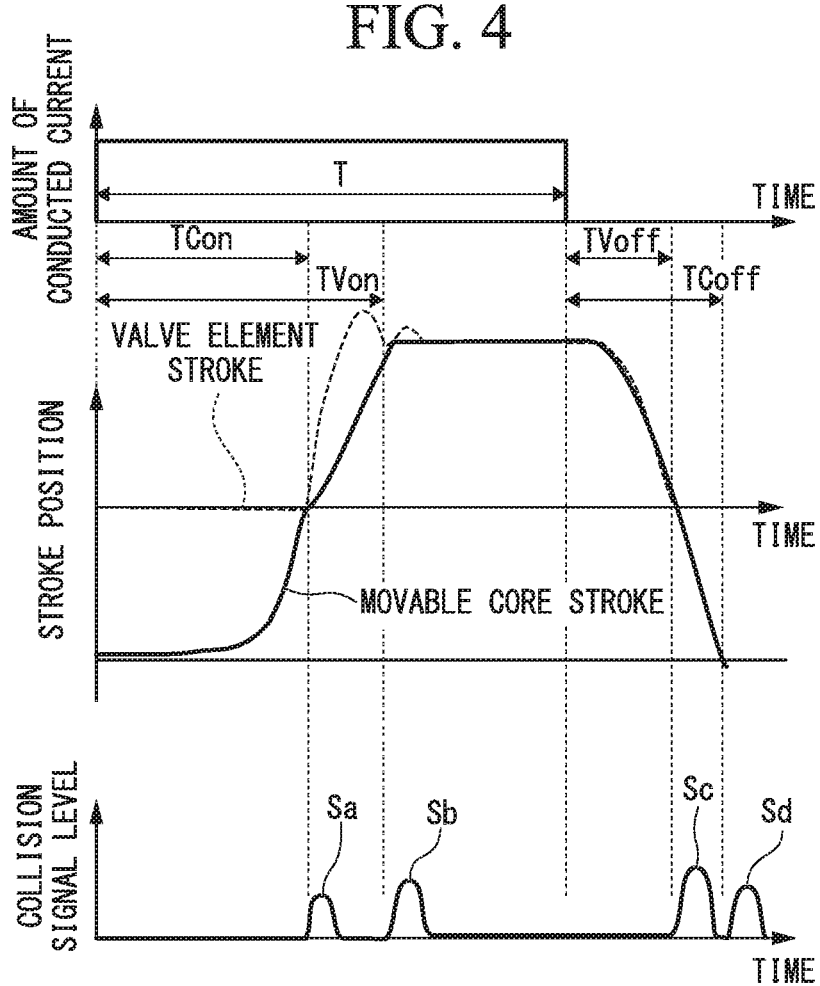

FUEL INJECTION CONTROL APPARATUS

CROSS-REFERENCE TO RELATED APPLICATION

Priority is claimed on Japanese Patent Application No. 2015-100120, filed on May 15, 2015, the contents of which are incorporated herein by reference.

BACKGROUND OF THE INVENTION

1. Field of the Invention

The present invention relates to a fuel injection control apparatus.

2. Description of Related Art

Until now, a fuel injection control apparatus controlling an injection amount of fuel from a fuel injection valve has been mounted in a vehicle.

This fuel injection control apparatus detects a valve opening period of the fuel injection valve, and finds the injection amount of the fuel on the basis of this period. For example, in Japanese Unexamined Patent Application, First Publication No. 2014-152740 (hereinafter, Patent Literature 1), a fuel injection control apparatus that detects a valve opening period using a signal acquired from an in-cylinder pressure sensor installed at a tip of a fuel injection valve is disclosed.

SUMMARY OF THE INVENTION

However, in the invention disclosed in Patent Literature 1, since a shock occurring when a valve element is fully opened is detected by the in-cylinder pressure sensor and the valve opening period is calculated starting from this time, an injection amount of fuel from a time at which the valve element starts to be opened to a time at which the valve element is fully opened is not taken into consideration. Accordingly, it is not possible to calculate a more accurate injection amount of the fuel including the injection amount of fuel from the time at which the valve element starts to be opened to the time at which the valve element is fully opened.

In recent years, a fuel injection valve having a hammering core structure in which a valve element acting as the fuel injection valve and a movable core are used as separate structures has been popularized. It is thought that the invention disclosed in Patent Literature 1 could be applied to this fuel injection valve having the hammering core structure. However, as described above, in the invention disclosed in Patent Literature 1, the injection amount of the fuel from the time at which the valve element starts to be opened to the time at which the valve element is fully opened is not taken into consideration. For this reason, it is not possible to meet a demand for higher accuracy of recent fuel injection control.

Aspects according to the present invention have been made in view of the above problem and are directed to enabling more accurate fuel injection control in a fuel injection control apparatus that controls a fuel injection device having a hammering core structure.

To solve the above problems to achieve the relevant object, the present invention employs the following aspects.

(1) A fuel injection control apparatus according to an aspect of the present invention is which controls a fuel injection valve that is equipped with a valve seat, a valve element, a movable core independent of the valve element, and a stationary core stopping displacement of the movable core, and includes: a first valve opening timing determination portion configured to determine a first valve opening timing on the basis of a first collision signal that is included in input signals input from a detection portion detecting an operating state of the fuel injection valve and indicates a timing at which the valve element starts to be opened; and a second valve opening timing determination portion configured to determine a second valve opening timing on the basis of a second collision signal that is included in the input signals input and indicates a timing at which the valve element is fully opened.

(2) In the aspect of (1), an injection amount of fuel may be corrected on the basis of the first valve opening timing and the second valve opening timing.

(3) In the aspect of (2), a valve closing timing may be determined on the basis of a third collision signal that is included in the input signals input from the detection portion and indicates a timing at which the valve element is closed, and the injection amount of the fuel may be calculated on the basis of the valve closing timing, the first valve opening timing, and the second valve opening timing.

(4) In any one of the aspects of (1) to (3), the detection portion may be an in-cylinder pressure sensor installed in a cylinder.

(5) In any one of the aspects of (1) to (3), the detection portion may be a vibration sensor.

(6) In any one of the aspects of (1) to (5), a failure of the detection portion may be detected on the basis of the first collision signal or a fourth collision signal indicating a timing at which the movable core is stopped at the time of valve closing.

According to the aspects of the present invention, in the fuel injection control apparatus, vibration caused by a collision between the movable core and the valve element of the fuel injection valve having a hammering core structure and vibration caused by a collision between the movable core and the stationary core can be detected. For this reason, the first valve opening timing (the timing at which the valve element starts to be opened) can be determined, and the second valve opening timing (the timing at which the valve element is fully opened) can also be determined. Accordingly, in the fuel injection valve having the hammering core structure, more accurate fuel injection control is possible.

BRIEF DESCRIPTION OF THE DRAWINGS

FIGS. 3A-3D are graphs illustrating a relationship between operations of a valve element and a movable core of the fuel injection valve and detected signals from an in-cylinder pressure sensor.

FIG. 4 is a graph illustrating a relationship between a current-conducting period for which an electric current is conducted to a coil of the fuel injection valve, the operations of the valve element and the movable core of the fuel injection valve, and the detected signals from the in-cylinder pressure sensor.

DETAILED DESCRIPTION OF THE INVENTION

Figure 1:
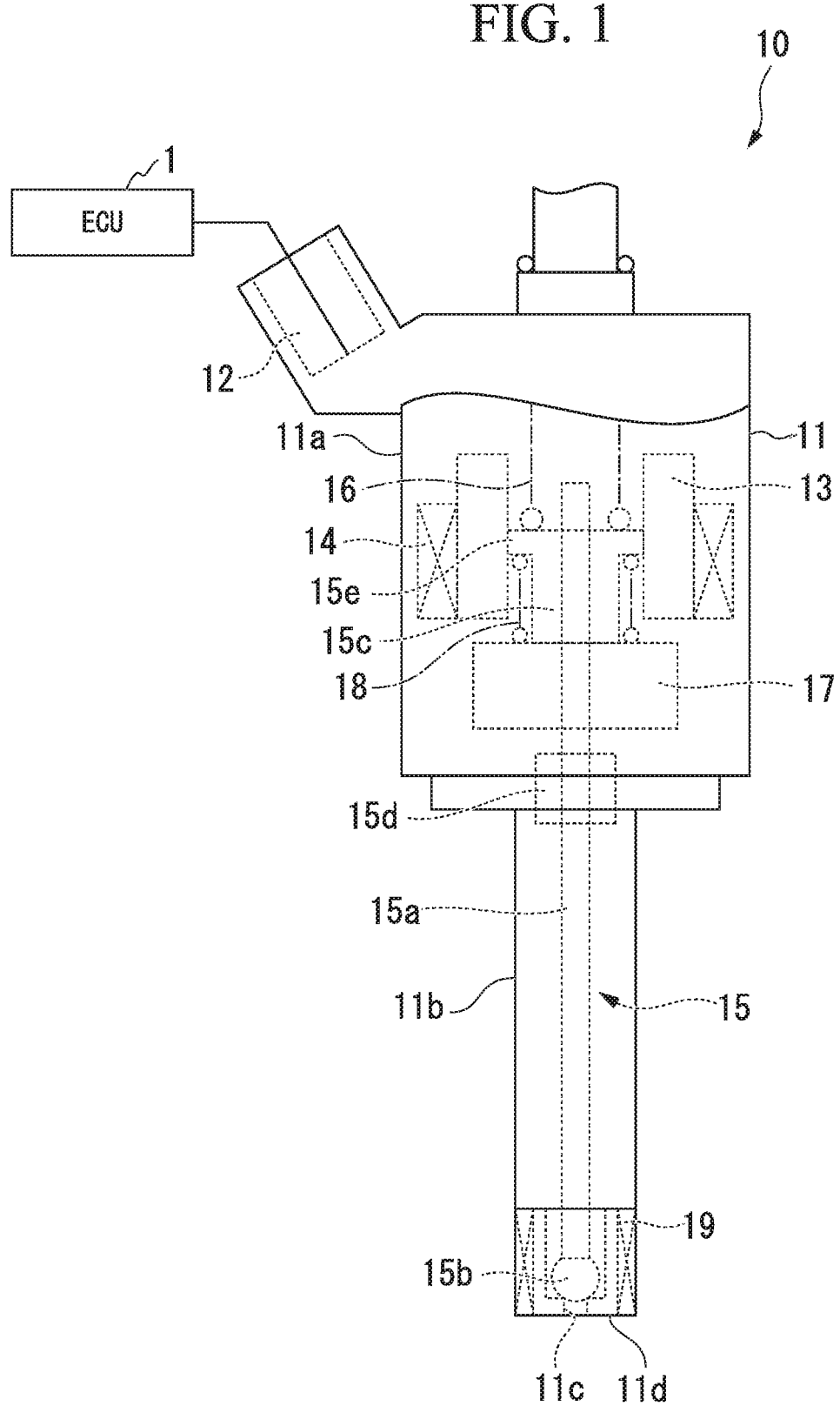
FIG. 1 is a schematic view illustrating a fuel injection valve and an engine control unit (ECU) in an embodiment of the present invention.

Hereinafter, an embodiment of a fuel injection control apparatus according to the present invention will be described with reference to the drawings. In the drawings below, the scale of each member is appropriately changed such that each member has a recognizable size. Also, the fuel injection control apparatus of the present embodiment is assembled in an engine control unit (ECU) 1 mounted in a vehicle.

First, a fuel injection valve 10 controlled by the ECU 1 of the present embodiment will be described with reference to FIGS. 1 to 4. FIG. 1 is a schematic view illustrating the fuel injection valve 10 and the ECU 1. As illustrated in this figure, the fuel injection valve 10 is equipped with a housing 11, a connecting coupler 12, a stationary core 13, a coil 14, a valve element 15, a valve element biasing spring 16, a movable core 17, a movable core biasing spring 18, and an in-cylinder pressure sensor 19.

The housing 11 is a case in which the stationary core 13, the coil 14, the valve element 15, the valve element biasing spring 16, the movable core 17, and the movable core biasing spring 18 are housed. This housing 11 has a large diameter portion 11a in which the stationary core 13, the coil 14, etc. are housed, and a small diameter portion 11b that is concentrically connected to the large diameter portion 11a. Also, a tip portion of the small diameter portion 11b serves as a valve seat 11d in which an injection hole 11c injecting fuel is formed. This housing 11 is configured to allow the fuel to be supplied from an upper portion of FIG. 1 to an interior thereof. The connecting coupler 12 is connected to an end of the housing 11 which is located at the large diameter portion 11a, and obliquely protrudes from the housing 11 in a lateral direction. This connecting coupler 12 is a portion that electrically connects the fuel injection valve 10 and the ECU 1 of the present embodiment.

The stationary core 13 is a cylindrical member that is concentrically housed in the large diameter portion 11a of the housing 11 and is fixed to the housing 11 by a fixture (not illustrated). This stationary core 13 is formed of a magnetic material. An end face of the stationary core 13 which is directed to the valve seat 11d serves as a contact face with the movable core 17. The coil 14 is formed of a conducting wire that is wound in an annular shape and is disposed concentrically with the stationary core 13 to surround the stationary core 13 from the outside. This coil 14 is electrically connected with a power-supplying unit (not illustrated) controlled by the ECU 1 through the connecting coupler 12, and generates a magnetic field as an electric current is supplied from the power-supplying unit.

The valve element 15 is equipped with a valve needle 15a, a valve portion 15b, a guide member 15c, and a stopper 15d. The valve needle 15a is a long rod member that extends along a central axis of the stationary core 13. As illustrated in FIG. 1, this valve needle 15a is disposed such that a part thereof directed to the stationary core 13 is located in the stationary core 13 and a part thereof directed to the valve seat 11d protrudes from the stationary core 13 toward the valve seat 11d. The valve portion 15b is a spherical region that is fixed to a tip of the valve needle 15a which is directed to the valve seat 11d. This valve portion 15b comes into contact with the valve seat 11d, thereby closing the injection hole 11c and is separated from the valve seat 11d, thereby opening the injection hole 11c.

The guide member 15c is a cylindrical member that is fixed adjacent to an end of the valve needle 15a which is directed to the opposite side of the valve portion 15b. This guide member 15c is configured such that an end face thereof directed to the valve portion 15b serves as a contact face with the movable core 17 and an end face thereof directed to the opposite side of the valve portion 15b serves as a contact face with the valve element biasing spring 16. Also, a flange 15e that protrudes in a radial direction of the valve needle 15a is formed at an end of the guide member 15c which is directed to the opposite side of the valve portion 15b. This flange 15e is configured such that a circumferential surface thereof serves as a sliding surface relative to an inner circumferential surface of the stationary core 13 and a surface thereof directed to the valve portion 15b serves as a contact surface with the movable core biasing spring 18. When the valve portion 15b is in contact with the valve seat 11d, this guide member 15c is fixed to the valve needle 15a such that the end face thereof (the contact face with the movable core 17) directed to the valve portion 15b is located closer to the valve seat 11d than the end face of the stationary core 13 which is directed to the valve seat 11d.

The stopper 15d is a cylindrical member that is fixed to the valve needle 15a between the valve portion 15b and the guide member 15c. This stopper 15d is configured such that an end face thereof directed to the guide member 15c serves as a contact face with the movable core 17 and is disposed such that this contact face is separated from the end face of the guide member 15c which is directed to the valve portion 15b to be greater than a thickness of the movable core 17.

The valve element biasing spring 16 is a compression coil spring that is housed in the stationary core 13 and is inserted between an inner wall surface of the housing 11 and the guide member 15c of the valve element 15. This valve element biasing spring 16 biases the valve element 15 toward the valve seat 11d. That is, the valve element 15 is configured such that, when no power is supplied to the coil 14, the valve portion 15b is brought into contact with the valve seat 11d by a biasing force of the valve element biasing spring 16.

The movable core 17 is disposed between the guide member 15c and the stopper 15d of the valve element 15 at the side of the valve seat 11d relative to the stationary core 13. This movable core 17 is a cylindrical member having a through-hole formed at the center thereof into which the valve needle 15a is inserted, and is configured such that an inner wall surface of the through-hole can slide relative to the valve needle 15a. That is, the movable core 17 is provided independently of the valve element 15 and is configured to be able to be displaced relative to the valve element 15 in a direction in which the valve needle 15a extends. Also, an end face of the movable core 17 which is directed to the guide member 15c serves as a contact face with the stationary core 13 and the movable core biasing spring 18. In addition, an end face of the movable core 17 which is directed to the stopper 15d serves as a contact face with the stopper 15d. This movable core 17 is formed of a magnetic material. If an electric current is conducted to the coil 14 and the coil 14 is excited, a flux path including the stationary core 13 and the movable core 17 is formed, and the movable core 17 is displaced toward the stationary core 13 by an attractive force generated by the formation of the flux path.

The movable core biasing spring 18 is a compression coil spring that surrounds the valve needle 15a, and is inserted between the flange 15e of the guide member 15c with which the valve element 15 is provided and the movable core 17. This movable core biasing spring 18 biases the movable core 17 toward the stopper 15d. That is, when no power is supplied to the coil 14, the movable core 17 is brought into contact with the stopper 15d by a biasing force of the movable core biasing spring 18.

The in-cylinder pressure sensor 19 is fixed to a circumferential surface of the tip portion of the small diameter portion 11b of the housing 11. This in-cylinder pressure sensor 19 is a sensor that detects and outputs a pressure in a cylinder in which the fuel injection valve 10 is installed. Further, since the in-cylinder pressure sensor 19 is fixed to the housing 11, a shock generated by the fuel injection valve 10 is transmitted, and the in-cylinder pressure sensor 19 outputs detected signals including this shock. In the present embodiment, the in-cylinder pressure sensor 19 outputs the detected signals including a signal (hereinafter referred to as "first collision signal") that indicates a shock when the movable core 17 collides with the guide member 15c of the valve element 15, a signal (hereinafter referred to as "second collision signal") that indicates a shock when the movable core 17 collides with the stationary core 13, a signal (hereinafter referred to as "third collision signal") that indicates a shock when the valve portion 15b of the valve element 15 collides with the valve seat 11d, and a signal (hereinafter referred to as "fourth collision signal") that indicates a shock when the movable core 17 collides with the stopper 15d of the valve element 15. In this way, the in-cylinder pressure sensor 19 detects not only the pressure in the cylinder but also operating states of the fuel injection valve 10 (colliding states of the movable core 17, etc.).

Next, an operation of the fuel injection valve 10 configured in this way will be described. Here, the description will be made from a state in which no current is supplied to the coil 14.

FIG. 1 used for describing the constitution of the above fuel injection valve 10 is a view illustrating the state in which no current is supplied to the coil 14. As illustrated in this figure, in the state in which no current is supplied to the coil 14, the valve portion 15b of the valve element 15 is brought into contact with the valve seat 11d by the biasing force of the valve element biasing spring 16. In this way, as the valve portion 15b is brought into contact with the valve seat 11d, the injection hole 11c is closed. Also, in the state in which no current is supplied to the coil 14, the movable core 17 is brought into contact with the stopper 15d of the valve element 15 by the biasing force of the movable core biasing spring 18.

Figure 2A:
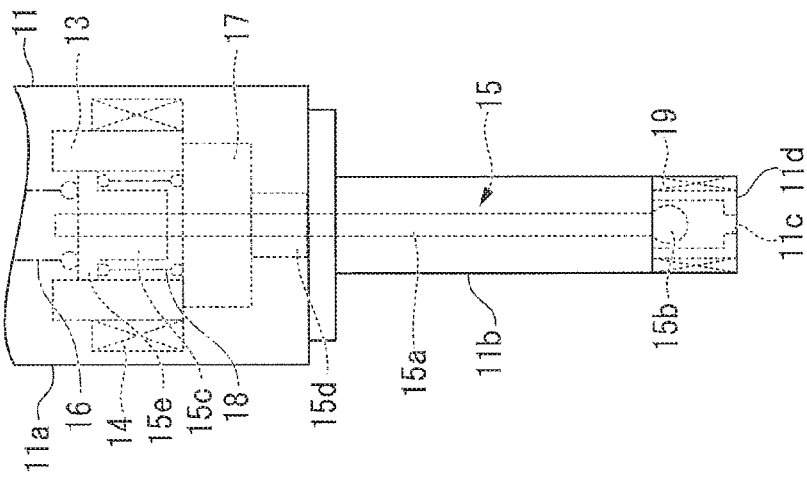
FIGS. 2A-2C are schematic views for describing a valve opening operation of the fuel injection valve.
Figure 2B:
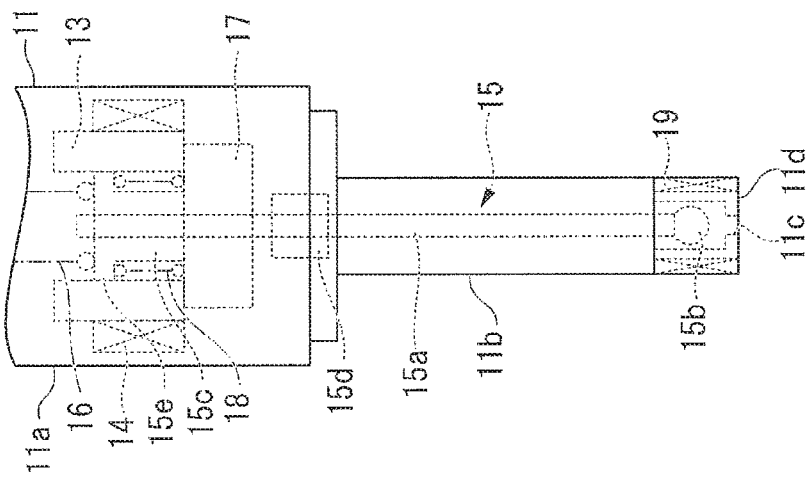

FIGS. 2 A to 2 C are schematic views for describing a valve opening operation of the fuel injection valve 10. If an electric current is supplied to the coil 14 from the power-supplying unit (not illustrated) under the control of the ECU 1, the coil 14 is excited. Thereby, the flux path including the stationary core 13 and the movable core 17 is formed, and the movable core 17 is displaced toward the stationary core 13 by the attractive force generated thereby. As a result, as illustrated in FIG. 2 A, the movable core biasing spring 18 is contracted, and the movable core 17 collides with the guide member 15c of the valve element 15 while the movable core 17 is being separated from the stopper 15d.

Figure 2C:
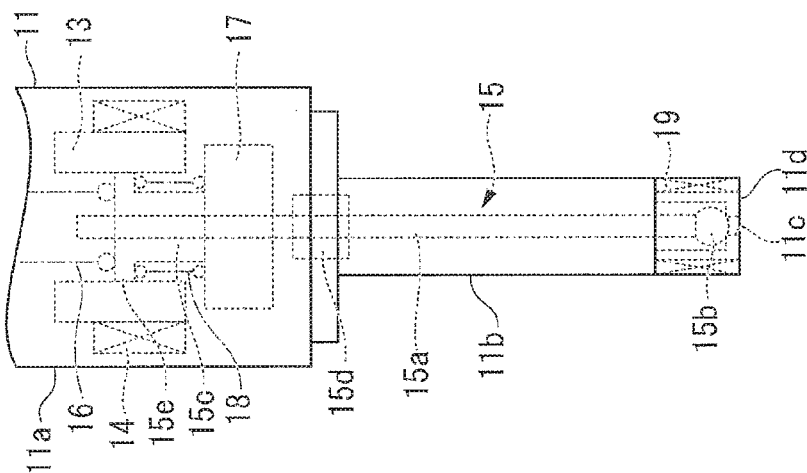

Further, if the movable core 17 is displaced toward the stationary core 13, the valve element 15 is raised and displaced in a direction in which the valve element 15 is separated from the valve seat 11d. As a result, the valve portion 15b of the valve element 15 is separated from the valve seat 11d, and the injection hole 11c is opened so that injection of fuel is initiated. In this way, the movable core 17 displaced by a magnetic force is stopped, as illustrated in FIG. 2 B, by colliding with the stationary core 13. At this time, the valve element 15 continues to be displaced by an inertial force. As a result, as illustrated in FIG. 2C, the guide member 15c is temporarily lifted from the movable core 17, and then returns to a position at which the guide member 15c comes into contact with the movable core 17 due to the biasing force of the valve element biasing spring 16. The valve opening operation of the fuel injection valve 10 is finished in the order described above.

Also, while the opening of the valve is maintained (i.e., while an instruction to open the valve is input from the ECU 1), a fixed amount of current is supplied to the coil 14, and a state in which the valve portion 15b of the valve element 15 is separated from the valve seat 11d is maintained.

When the fuel injection valve 10 opened in this way is closed, the supply of the electric current to the coil 14 is stopped. In this way, if the supply of the electric current to the coil 14 is stopped, the magnetic force generated between the stationary core 13 and the movable core 17 disappears, and the valve element 15 is displaced toward the valve seat 11d by the biasing force of the valve element biasing spring 16. As a result, the valve portion 15b of the valve element 15 comes into contact with the valve seat 11d so that the injection hole 11c is closed. Afterwards, the movable core 17 is displaced toward the stopper 15d of the valve element 15 by the biasing force of the movable core biasing spring 18 and comes into contact with the stopper 15d, and thereby the movable core 17 is stopped.

Also, in addition to the signal indicating the pressure in the cylinder, the detected signals in which the first collision signal, the second collision signal, the third collision signal, and the fourth collision signal are included are output from the in-cylinder pressure sensor 19 with which the fuel injection valve 10 is equipped. FIGS. 3 A to 3 D are graphs illustrating a relationship between the operations of the valve element 15 and the movable core 17 of the fuel injection valve 10 and the detected signals from the in-cylinder pressure sensor 19. In each of FIGS. 3 A to 3 D, an upper side is a graph illustrating a relationship between a time and stroke positions of the valve element 15 and the movable core 17, and a lower side is a graph illustrating a relationship between a time and levels of the collision signals included in the detected signals output from the in-cylinder pressure sensor 19. In the graph illustrated at the upper side in each of FIGS. 3 A to 3 D, a position at which the movable core 17 and the guide member 15c of the valve element 15 collide with each other during the valve opening operation is set as a position at which the stroke position is zero.

As illustrated in FIG. 3 A, if the electric current is supplied to the coil 14, only the movable core 17 is displaced, and a first collision signal Sa is output from the in-cylinder pressure sensor 19 at a timing at which the movable core 17 and the guide member 15c of the valve element 15 collide with each other. The movable core 17 is further displaced, and as illustrated in FIG. 3 B, a second collision signal Sb is output from the in-cylinder pressure sensor 19 at a timing at which the movable core 17 collides with the stationary core 13.

When the valve is closed, the valve element 15 and the movable core 17 are displaced in a direction of the valve seat 11d, and as illustrated in FIG. 3 C, a third collision signal Sc is output from the in-cylinder pressure sensor 19 at a timing at which the valve portion 15b collides with the valve seat 11d. Further, only the movable core 17 is displaced in the direction of the valve seat 11d, and as illustrated in FIG. 3 D, a fourth collision signal Sd is output from the in-cylinder pressure sensor 19 at a timing at which the movable core 17 collides with the stopper 15d of the valve element 15.

Further, a period for which the fuel injection valve 10 is opened will be described with reference to FIG. 4. FIG. 4 is a graph illustrating a relationship between a current-conducting period for which an electric current is conducted to the coil 14, the operations of the valve element 15 and the movable core 17 of the fuel injection valve 10, and the detected signals from the in-cylinder pressure sensor 19. As illustrated in this figure, T is set as a current-conducting period for which the electric current is conducted to the coil 14, TCon is set as a period from a time at which the electric current starts to be conducted to the coil 14 to a time at which the first collision signal Sa is output, TVon is set as a period from the time at which the electric current starts to be conducted to the coil 14 to a time at which the second collision signal Sb is output, TVoff is set as a period from a time at which the electric current stops being conducted to the coil 14 to a time at which the third collision signal Sc is output, and TCoff is set as a period from the time at which the electric current stops being conducted to the coil 14 to a time at which the fourth collision signal Sd is output.

An actual valve opening period for which fuel is actually injected from the injection hole 11c is between an instant in which the valve portion 15b of the valve element 15 is separated from the valve seat 11d (i.e., a timing at which the first collision signal Sa is output) and an instant in which the valve portion 15b collides with the valve seat 11d (i.e., a timing at which the third collision signal Sc is output). Therefore, if the current-conducting period is defined as T, and the actual valve opening period is defined as Tr, the actual valve opening period Tr is expressed by Formula (1) below.

$$Tr = T - T\text{Con} + TV\text{off} \quad (1)$$

Figure 5:
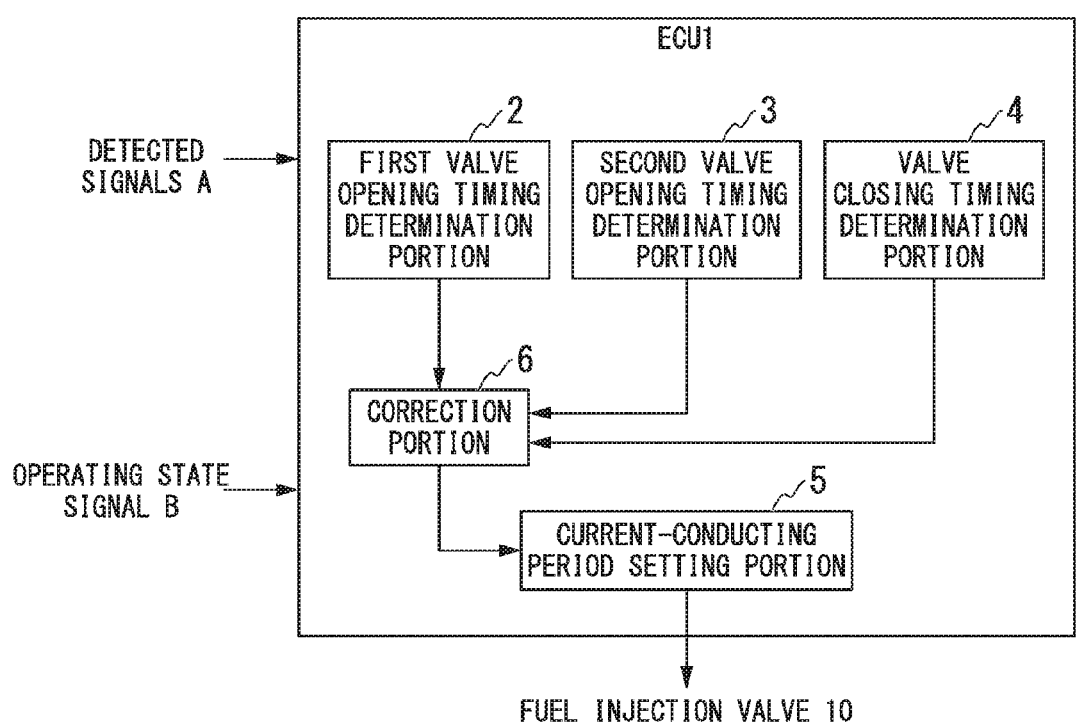
FIG. 5 is a function block diagram of the ECU in the embodiment of the present invention.
Figure 6:
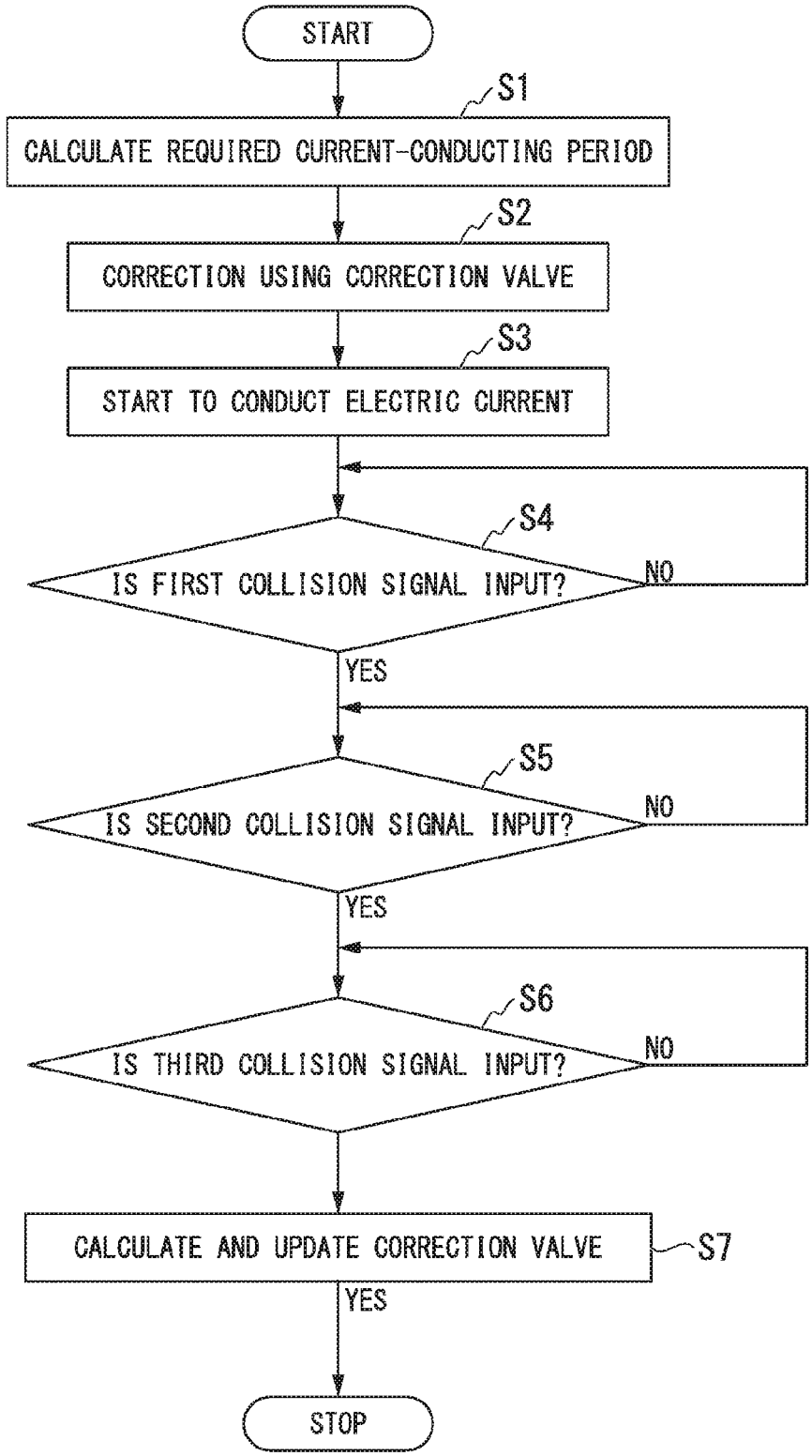
FIG. 6 is a flow chart for describing an operation for detecting and correcting a valve opening timing of the fuel injection valve using the ECU in the embodiment of the present invention.

Next, the ECU 1 of the present embodiment will be described in detail with reference to FIGS. 5 and 6. FIG. 5 is a function block diagram of the ECU 1.

As illustrated in FIG. 5, the ECU 1 of the present embodiment is equipped with a first valve opening timing determination portion 2, a second valve opening timing determination portion 3, a valve closing timing determination portion 4, a current-conducting period setting portion 5, and a correction portion 6. Further, the ECU 1 is provided with hardware such as an IC chip or a memory, and software stored in, for instance, the memory. The first valve opening timing determination portion 2, the second valve opening timing determination portion 3, the valve closing timing determination portion 4, the current-conducting period setting portion 5, and the correction portion 6 are realized by cooperation of the aforementioned hardware and software.

The detected signals A from the in-cylinder pressure sensor 19 (the input signals that are input from the detection portion) and an operating state signal B are input into the ECU 1. The first valve opening timing determination portion 2 detects the first collision signal Sa from the detected signals A, and determines a time at which the first collision signal Sa is input into the ECU 1 as a first valve opening timing. The second valve opening timing determination portion 3 detects the second collision signal Sb from the detected signals A, and determines a time at which the second collision signal Sb is input as a second valve opening timing. The valve closing timing determination portion 4 detects the third collision signal Sc from the detected signals A, and determines a time at which the third collision signal Sc is detected as a valve closing timing.

The current-conducting period setting portion 5 calculates a required current-conducting period Ti of the fuel injection valve from the operating state signal B. This required current-conducting period Ti does not take into consideration an injection amount of the fuel injected for a valve opening operation period To from the first valve opening timing to the second valve opening timing. Also, the required current-conducting period Ti does not take into consideration an injection amount of the fuel injected for a valve closing operation period Tc (TVoff illustrated in FIG. 4) from a fully open state to the valve closing timing. For this reason, the current-conducting period setting portion 5 further finds the current-conducting period T that is the period for which the valve opening control of the valve element 15 is performed using a correction value C calculated by the correction portion 6. Here, the current-conducting period setting portion 5 calculates the current-conducting period T from the required current-conducting period Ti and the correction value C on the basis of Formula (2) below.

$$T = Ti + C \quad (2)$$

The correction portion 6 calculates the valve opening operation period To from a difference between the first valve opening timing determined by the first valve opening timing determination portion 2 and the second valve opening timing determined by the second valve opening timing determination portion 3. Further, the correction portion 6 calculates the valve closing operation period Tc from a time at which the current-conducting period comes to an end to the valve closing timing determined by the valve closing timing determination portion 4. The correction portion 6 calculates the injection amount of the fuel injected for the valve opening operation period To and the injection amount of the fuel injected for the valve closing operation period Tc, and calculates the correction value C based on the injection amounts of the fuel in question.

Next, an operation of the ECU 1 that is the fuel injection control apparatus according to the present embodiment will be described in detail using FIG. 6. FIG. 6 is a flow chart from a time at which the ECU 1 acquires the operating state signal B to a time at which the ECU 1 completes the valve opening control of the fuel injection valve.

If an operating state signal B from a vehicle is input into the current-conducting period setting portion 5, first, the current-conducting period setting portion 5 finds a required current-conducting period Ti corresponding to the operating state signal B (step S1). Further, the current-conducting period setting portion 5 calculates a current-conducting period T using a correction value C on the basis of Formula (2) above (step S2). The correction value C used herein is to be previously calculated by the correction portion 6, and is to be calculated on the basis of a previous first valve opening timing and a previous second valve opening timing.

If the current-conducting period T is calculated, the ECU 1 starts to conduct an electric current to the fuel injection valve via a power-supplying unit (step S3). Next, the first valve opening timing determination portion 2 determines from detected signals A whether or not a first collision signal Sa occurring when the movable core 17 and the guide member 15c collide with each other is input (step S4). Next, the second valve opening timing determination portion 3 similarly determines from the detected signals A whether or not a second collision signal Sb occurring when the movable core 17 collides with the stationary core 13 is input (step S5).

Next, the valve closing timing determination portion 4 determines from the detected signals A whether or not a third collision signal Sc occurring when the valve portion 15b collides with the valve seat 11d is input (step S6).

When the third collision signal Sc is input, the correction portion 6 calculates a valve opening operation period To and a valve closing operation period Tc. Further, the correction portion 6 calculates a correction value C based on these, and updates the correction value C stored in the current-conducting period setting portion 5 (step S7). The correction value C calculated in step S7 is to be calculated on the basis of a newest first valve opening timing, a newest second valve opening timing, and a newest valve closing timing. If the updating is completed, the ECU 1 completes the process.

According to this ECU 1 of the present embodiment, in the control of the fuel injection valve having a hammering core structure, the first valve opening timing determination portion 2 that determines the first valve opening timing from the detected signals A from the in-cylinder pressure sensor 19 and the second valve opening timing determination portion 3 that determines the second valve opening timing from the detected signals A from the in-cylinder pressure sensor 19 are provided. For this reason, it is possible to adjust the injection amount considering the injection amount of the fuel in the valve opening operation period To. Therefore, according to the ECU 1 of the present embodiment, more accurate fuel injection control is possible in the fuel injection valve having the hammering core structure.

Also, according to the ECU 1 of the present embodiment, the valve closing timing determination portion 4 that determines the valve closing timing is provided. For this reason, an accurate actual valve opening period Tr can be calculated from the first valve opening timing and the valve closing timing.

Even when the valve element 15 is stuck (the valve element 15 is not displaced) due to some cause, due to the fuel injection valve 10 having the hammering core structure in which the valve element 15 and the movable core 17 have independent structures, the first collision signal Sa is output when the electric current is supplied to the coil 14. Also, the fourth collision signal Sd is output when the supply of the electric current to the coil 14 is stopped. Accordingly, when the first collision signal Sa or the fourth collision signal Sd is not detected when the electric current is supplied to the coil 14 or when the supply of the electric current to the coil 14 is stopped, it can be determined that the in-cylinder pressure sensor 19 is broken.

In the ECU 1 of the present embodiment, the correction value C is found by the first valve opening timing, the second valve opening timing, and the valve closing timing. In the ECU 1 of the present embodiment, the injection amount of the fuel in the valve opening operation period To may be configured to be calculated from these first and second valve opening timings. Since the injection amount of the fuel calculated in this way is an accurate injection amount of the fuel based on the first and second valve opening timings, it is possible to know the accurate injection amount of the fuel.

While the preferred embodiment of the present invention has been described with reference to the attached drawings, it goes without saying that the present invention is not limited to the above embodiment. All the shapes and combinations of the components shown in the aforementioned embodiment are only examples and can be variously modified based on design requirements without departing from the spirit and scope of the present invention.

For example, in the above embodiment, the in-cylinder pressure sensor 19 is used for the detection of vibration caused by the collision of the valve element 15. However, the present invention is not limited thereto, a separate vibration sensor or another sensor may be installed.

Also, the fuel injection valve 10 has a structure in which the stationary core 13 and the movable core 17 collide with each other. However, another member (e.g., a collar) may be installed between the stationary core 13 and the movable core 17.

Also, in the above embodiment, the constitution in which the fuel injection control apparatus of the present invention is the ECU 1 has been described. However, the present invention is not limited thereto, and the fuel injection control apparatus may be installed independently of the ECU 1.

In addition, in the above embodiment, the constitution in which the valve closing timing determination portion 4 is provided has been described. However, the present invention is not limited thereto, and may employ a constitution in which the valve closing timing determination portion 4 is not provided.

What is claimed is:

1. A fuel injection control apparatus which controls a fuel injection valve that is equipped with a valve seat, a valve element, a movable core independent of the valve element, and a stationary core stopping displacement of the movable core, the fuel injection control apparatus comprising:
a first valve opening timing determination portion configured to determine a first valve opening timing on the basis of a first collision signal that is included in input signals input from a detection portion detecting an operating state of the fuel injection valve and indicates a timing at which the valve element starts to be opened; and
a second valve opening timing determination portion configured to determine a second valve opening timing on the basis of a second collision signal that is included in the input signals input and indicates a timing at which the valve element is fully opened.

2. The fuel injection control apparatus according to claim 1, wherein an injection amount of fuel is corrected on the basis of the first valve opening timing and the second valve opening timing.

3. The fuel injection control apparatus according to claim 2, wherein a valve closing timing is determined on the basis of a third collision signal that is included in the input signals input from the detection portion and indicates a timing at which the valve element is closed, and the injection amount of the fuel is calculated on the basis of the valve closing timing, the first valve opening timing, and the second valve opening timing.

4. The fuel injection control apparatus according to claim 1, wherein the detection portion is an in-cylinder pressure sensor installed in a cylinder.

5. The fuel injection control apparatus according to claim 1, wherein the detection portion is a vibration sensor.

6. The fuel injection control apparatus according to claim 1, wherein a failure of the detection portion is detected on the basis of the first collision signal or a fourth collision signal indicating a timing at which the movable core is stopped at the time of valve closing.

* * * * *